Oct. 1, 1963 C. E. COOK ETAL 3,105,967
VELOCITY MEASURING RADAR APPARATUS FOR HIGH SPEED VEHICLES
Filed Jan. 12, 1959
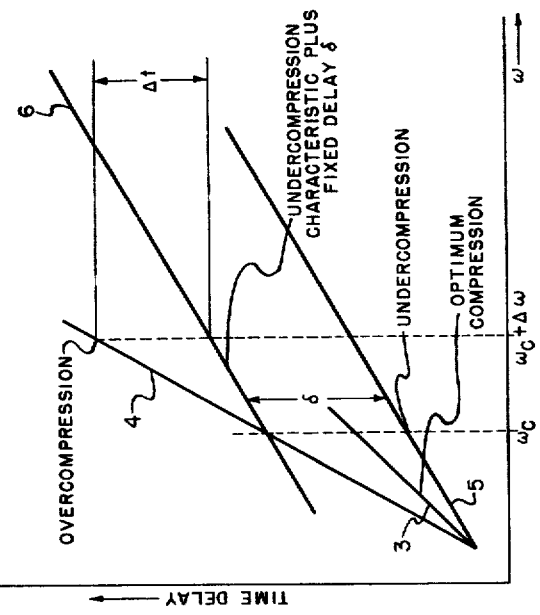
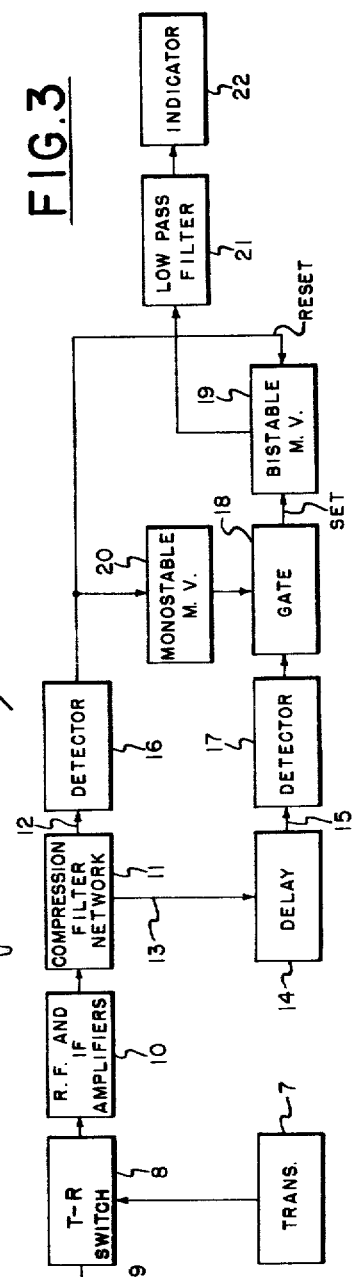
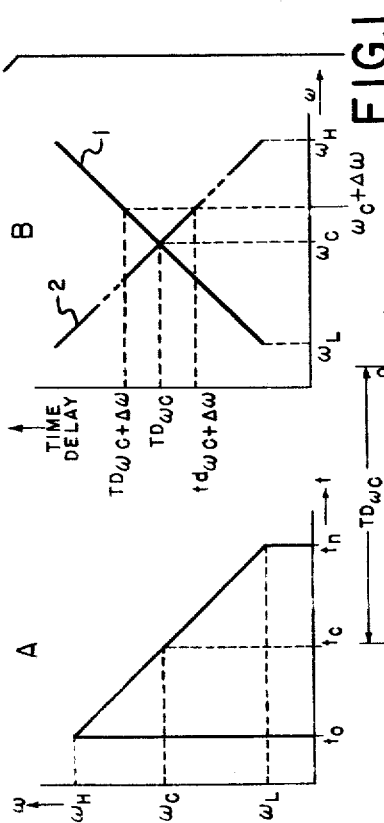
INVENTORS
CHARLES E. COOK
JOHN E. CHIN
BY
ATTORNEY United States Patent Office 3,105,967
Patented Oct. 1, 1963

3,105,967
VELOCITY MEASURING RADAR APPARATUS FOR HIGH SPEED VEHICLES
Charles E. Cook, Farmingdale, and John E. Chin, Woodside, N.Y., assignors to Sperry Rand Corporation, a corporation of Delaware
Filed Jan. 12, 1959, Ser. No. 786,351
8 Claims. (Cl. 343—17.2)

The present invention generally relates to target velocity measuring radar apparatus and, more particularly, to such apparatus especially suited for the velocity determination of high speed vehicles situated at long ranges.

Radar apparatus for the determination of target velocity generally has suffered from severe range limitation. For example, continuous wave radars which are suitable for target velocity measurement must operate in the presence of the transmitted signal which substantially limits the maximum detectable range of the moving target. The continuous mode of operation of the radar transmitter produces an ubiquitous carrier signal which cannot be effectively isolated from the radar receiver. As is well known, the amplitude of the target echo signal decreases in proportion to the fourth power of the target range whereas the continuous transmitted carrier inevitably coupled into the radar receiver is of relatively fixed amplitude. As a consequence, the signal-to-noise ratio of the target echo signal rapidly deteriorates as a function of target range.

Alternative pulsed radar target velocity measuring systems have been proposed to overcome the aforesaid carrier interference problem inherent in continuous wave radars. However, other practical difficulties are encountered, for example, the velocity of the moving target cannot be determined within a single radar pulse repetition interval. Although target velocity information is present in the Doppler-shifted target echo signal, it is feasible to extract such velocity information only on the basis of long time integration of the echo signals. Additionally, the low repetition rate required for long range detection is incompatible with the unambiguous determination of target velocities of high value.

It is the principal object of the present invention to provide a pulsed radar target velocity measuring system adapted to yield target velocity information upon the reception of a single received target signal.

Another object is to provide a radar target measuring apparatus adapted by the technique of pulse compression for the determination of the velocity of high speed targets situated at long ranges.

A further object is to provide a radar system utilizing a frequency modulated transmitted carrier and frequency sensitive receiver delay means for the production of a pair of time displaced signals representing a single target, the displacement being a function of target velocity.

These and other objects of the present invention, as will appear upon a reading of the following specification, are achieved in a preferred embodiment of the present invention by the provision of a pulsed radar transmitter for the radiation of a directive beam of linearly frequency modulated electromagnetic energy. Means are included for the reception of returning target echo signals and for the simultaneous application of the received echo signals to first and second frequency sensitive signal delay means. The first and second delay means are each designed to introduce a unique time delay in the received echo signal as a function of its frequency content.

In the disclosed preferred embodiment, each of the delay means has a different linear time delay versus frequency characteristic. The characteristics are made to intersect at the I.F. frequency corresponding to the center frequency of the transmitted signal. As a consequence of the respective characteristics, each delay means produces a uniquely delayed output pulse in response to each simultaneously applied moving target echo pulse, the time displacement between the output pulses being a function of the velocity of the moving target. Means are provided for the determination of the time separation between the delayed pulses and hence the velocity of the moving target.

For a more complete understanding of the invention, reference should be had to the following specification and to the appended drawings, of which:

FIG. 1 is a series of diagrams illustrating the functioning of the frequency sensitive delay means of the present invention;

FIG. 2 is a superimposed plot of the frequency delay characteristics of the delay means utilized in the preferred embodiment; and FIG. 3 is a block diagram of the preferred embodiment of the present invention.

The present invention contemplates the use of pulse compression techniques somewhat similar to that disclosed in U.S. Patent 2,624,876, issued on January 6, 1953 in the name of R. H. Dicke. As more fully described in the patent, pulse compression is achieved in the radar receiver by the provision of a frequency-sensitive pulse delay means which operates on the received target echo pulse. The echo pulse, like the transmitted pulse, contains a frequency modulated carrier whose frequency varies linearly as a function of time. Such a frequency modulated transmitted pulse is represented in the plot of FIG. 1A.

In FIG. 1A, the carrier frequency of the transmitted pulse, occurring within the time intervals $t_0$ and $t_n$, is plotted with respect to time. It can be seen that the highest frequency carrier occurs at time $t_0$ and that the lowest frequency carrier occurs at time $t_n$. The frequency of the pulsed carrier is linearly varied with respect to time with the center frequency occurring at time $t_c$.

As shown in the Dicke patent, the relatively long duration transmitted pulse of FIG. 1A may be compressed into a relatively higher amplitude but shorter duration pulse by means of a frequency-sensitive receiver pulse delay means having a characteristic represented by solid line 1 of FIG. 1B. Line 1, representing the time delay versus frequency characteristic of the receiver compression filter, has a slope which is complementary to the sense of the linear frequency modulation imparted to the transmitted carrier. The effect of the compression filter having the characteristic of line 1 of FIG. 1B on a received echo pulse frequency modulated as shown in FIG. 1A is shown in FIG. 1C.

The earlier-occurring higher frequency components of transmitted pulse P are delayed in the compression filter to a greater extent than is the case with the later-occurring lower frequency components. Actually, all frequency components experience a delay in the receiver compression filter, the average delay (representing the delay of the center frequency of the frequency modulated pulse) being indicated as $TD_{ac}$.

The present invention utilizes the frequency-sensitive delay characteristic of the receiver compression filter to impart a delay to the received echo pulse as a function of the velocity of the target vehicle represented by said echo pulse. As is understood in the art, the signal reflected by an incoming target vehicle will be greater than that of the transmitted pulse by an amount which is related to target velocity. This is the well known "Doppler" effect. In terms of the frequency modulated transmitted pulse, each of the signal components will be shifted in frequency by the same amount. This is represented in FIG. 1B by the abscissa $\omega_c + \Delta\omega$. In this case, the pulse emerging from the receiver compression filter will experience an average time delay $TD_{\omega c + \Delta\omega}$ in contrast to the delay $TD_{\omega c}$ introduced into stationary target echo pulses. FIG. 1D illustrates the increased average time delay $\Delta TD$ interposed between the transmitted pulse P and the compressed pulse P' resulting from an incoming target.

By inspection of FIGS. 1C and 1D, it can be seen that the delay $\Delta TD$ is solely a function of target velocity for a given frequency modulated transmitted pulse. According to the present invention, two frequency sensitive pulse delay means are provided in the receiver for differentially delaying the received echo pulse by a measureable amount proportional to target velocity. Such a differential delay may be introduced by the use of two compression filters, one having a characteristic represented by solid line 1 of FIG. 1B and the other having a characteristic represented by the dashed line 2.

If a pair of respectively frequency modulated echo pulses are applied to corresponding compression filters, one having the delay characteristic of line 1 and the other having the delay characteristic of line 2, the pulses emerging from the respective compression filters will be differentially shifted in time by an amount proportional to the velocity-induced Doppler shift. Assuming that the average frequency $\omega_c$ of the echo pulse is Doppler-shifted by an amount $\Delta\omega$, the pulse emerging from the filter characterized by line 1 will be delayed an amount $TD_{\omega c + \Delta\omega}$ while the pulse emerging from the filter characterized by line 2 will be shifted an amount $td_{\omega c + \Delta\omega}$. It will be observed that although both filters introduce the same delay $TD_{\omega c}$ for stationary targets, the filter of line 1 introduces an increased delay for positive Doppler shifts, and the filter of line 2 interposes a lesser delay for positive Doppler shifts. By measuring the time difference between the occurrences of the pulses at the outputs of the compression filters, a direct indication may be had of the velocity of the moving target.

As discussed in the above-mentioned Dicke patent, it is required that the slope of the frequency modulation of the transmitted pulse be of opposite sense to the slope of the filter delay characteristic in order to achieve pulse compression. Consequently, in order to utilize two filters having the delay characteristics of lines 1 and 2, it becomes necessary to employ transmitted pulse pairs each having a frequency modulation slope of opposite sense to its respectively associated receiver compression filter. In order to obviate instrumentation difficulties arising out of the use of such a transmitted pulse pair, the preferred embodiment of the present invention shown in FIG. 3 utilizes first and second frequency-sensitive receiver compression filters having respective slopes of the same sense but different magnitude. The time delay versus frequency characteristics of the compression filters utilized in FIG. 3 are plotted in FIG. 2. Line 3 of FIG. 2 corresponds to line 1 of FIG. 1B and has a slope of sense and magnitude comparable to that of line 1. In conformance with the filter characteristic of line 3, it is presumed that the transmitted pulse is frequency modulated as represented in FIG. 1A.

It has been discovered that there exists but one slope magnitude for the compression filter at which optimum compression of the echo signal is achieved. Optimum compression is defined as that one which yields maximum pulse amplitude and minimum compression pulse width at the output of the compression filter. If the slope of the filter characteristic deviates from said optimum, such as the slopes of lines 4 or 5 of FIG. 2, not only is less than optimum compression achieved but also different amounts of average time delay are introduced into the echo signals. It will be observed that the slope of line 5 is less than that of the optimum compression characteristic 3 while the slope of line 4 is greater than optimum. The pulse widths resulting from the employment of filters having the characteristics of lines 4 and 5 may be made equal, although in both cases said widths will be greater than that of the optimally compressed pulse. The characteristic represented by line 5 is termed "under compression"; correspondingly, the characteristic represented by line 4 is termed "over compression."

Lines 4 and 5 may be made to intersect at the abscissa value $\omega_c$ by the introduction of a frequency insensitive delay increment $\delta$, the delay increment $\delta$ effectively translating line 5 to the parallel position of line 6. If a single linearly frequency modulated transmitted pulse is reflected from the moving target, the Doppler-shifted echo pulse (having a center frequency $\omega_c + \Delta\omega$) will experience a differential time delay $\Delta t$ at the outputs of the under compression and over compression filter networks.

The under compression and over compression technique illustrated in FIG. 2 is utilized in the preferred embodiment of the present invention disclosed in FIG. 3. In FIG. 3, a source of linearly frequency modulated pulsed carrier signals is represented by the numeral 7. Transmitter 7 imparts a frequency versus time characteristic to the carrier of the transmitted signal as represented in FIG. 1A. The output signal of transmitter 7 is coupled via T-R 8 to antenna 9 for the irradiation of targets lying within the radar beam. Echo signals reflected from a target are received by antenna 9 and coupled by T-R 8 to R.F. and I.F. amplifiers 10 in a conventional manner.

The output of amplifiers 10 is coupled to compression filter network 11 generally similar to the pulse compressor filter of the Dicke patent. Network 11 is designed to have the same band width as that of the pulse compressor filters of the prior art but includes more filter sections than are required for optimum compression. As is well understood, the pulse compressor filters of the prior art may comprise a cascaded plurality of identical filter sections, the number of sections being determined by optimum compression consideration. By the addition of supernumerary but identical networks, the filter is modified into one which produces the "over compression" function represented by line 4 of FIG. 2. If the filter network is tapped at a section prior to the section required for optimum compression, the filter sections between the input and the tapped point will produce the "under compression" function represented by line 5 of FIG. 2. The over compressed signals are made available on line 12 of FIG. 3 while the under compressed signals appear on line 13.

The under compressed signals appearing on line 13 are applied to a conventional frequency insensitive delay means 14. Delay 14 interposes the delay $\delta$ of FIG. 2 into the under compressed pulses appearing on line 13 so that the over compressed pulses of line 12 will be time-coincident with the delayed under compressed pulses on line 15 in the case of a stationary target. In the event that the target represented by the echo pulse at the output of amplifiers 10 is moving radially inward toward antenna 9, then a differential delay will be produced between the pulses appearing on lines 12 and 15 with the pulse on line 12 being delayed a greater amount than the pulses of line 15.

The pulsed I.F. signals at the outputs of network 11 and delay 14 are detected, respectively, in detectors 16, 17. The video pulse output of detector 17 is applied via normally conducting gate 18 to the set terminal of bistable multivibrator 19. The video pulse output of detector 16 is simultaneously applied to the reset terminal of multivibrator 19 and the trigger terminal of monostable multivibrator 20. The monostable multivibrator 20 produces an output pulse having a leading edge coincident with the output pulse of detector 16 and a trailing edge occurring a predetermined time thereafter for rendering gate 18 non-conductive. The square wave output signal of bistable multivibrator 19 is applied to low pass filter 21 which produces an output signal for application to indicator 22 proportional to the direct component of the square wave. The D.C. component is proportional to the duration or width of the rectangular output pulse of multivibrator 19, the amplitude of the output pulse being predetermined and fixed.

In operation, assuming that an echo signal from an incoming target is received, the respective delay characteristics of the over compression and under compression portions of network 11 impart a differential delay between the video pulses at the outputs of detectors 16 and 17 as previously described. The earlier of the output pulses passes through normally conducting gate 18 to set multivibrator 19 into a predetermined state. The later occurring video pulse at the output of detector 16 resets multivibrator 19 into its original condition thus terminating the rectangular output pulse which is applied to low pass filter 21. Inasmuch as the time delay between the video pulses at the outputs of detectors 16 and 17 is proportional to target velocity, the duration of the rectangular output pulse of multivibrator 19 is likewise proportional to target velocity. The D.C. component extracted by low pass filter 21, in turn proportional to the duration of the said rectangular pulse, proportionally actuates indicator 22 for the direct display of the velocity of the moving target.

Gate 18 and monostable multivibrator 20 are provided in the preferred embodiment to preclude response to targets moving away from rather than toward antenna 9. In the case that the velocity of the target is of opposite sense to that previously assumed, i.e., target range is increasing, then the pulse at the output of detector 16 will precede the pulse at the output of detector 17.

Such time inversion between the occurrences of the video pulses may be seen upon inspection of FIG. 2. In this case, the Doppler-induced frequency shift would be to the left of the $\omega_c$ abscissa, thereby producing in the under compression channel (output of detector 17) a greater delay than in the over compression channel (output of detector 16). Should the video pulse output of detector 16 precede the pulse at the output of detector 17, monostable multivibrator 20 will render gate 18 non-conductive for a predetermined length of time sufficient to prevent the passage of the later occurring pulse at the output of detector 17. Consequently, multivibrator 19 will not be actuated into producing its rectangular output and no velocity data will be displayed on indicator 22.

It should be noted that for a given carrier frequency shift, the differential time delay induced by two filter characteristics of the same slope sense but different slope magnitude, such as shown in FIG. 2, will be less than the differential delay induced by two filters of opposite slope sense as previously discussed in connection with FIG. 1B. That is, for a given Doppler-induced frequency shift in the echo signal, a greater difference in time delay is produced by filters having the characteristics represented by lines 1 and 2 of FIG. 1B than would be the case with filters having the characteristics of lines 4 and 6 of FIG. 2. Thus, it may be said that the preferred embodiment of FIG. 3 is particularly suited for the velocity measurement of high speed vehicles. At such high speeds, the smaller differential delay will be compensated for by the increased Doppler frequency shift.

Although signal averaging means including bistable multivibrator 19 and low pass filter 21 are shown in the preferred embodiment for illustrative purposes, no such averaging or time-consuming integration is required for velocity measurement. Velocity measurement can be achieved with a single radar repetition interval, if desired, by the use of any of the well known devices for determining the time separation between a single pair of pulses. For example, a calibrated source of clock pulses may be provided whose output pulses are gated into a pulse counter during the time intervening the occurrences of the pulses at the outputs of detectors 16 and 17. The number of pulses counted during the gating interval would be a direct indication of target velocity.

From the preceding, it can be seen that the objects of the present invention are achieved by the provision of a radar transmitter generating preferably a linearly frequency modulated pulsed carrier signal. Provision is made in the radar receiver for first and second frequency sensitive pulse delay means for imparting a differential delay into a received target echo signal. The determination of target velocity is effected by measuring said differential time delay.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a radar system adapted for the transmission of a pulsed carrier signal, apparatus including means for receiving a target echo signal, first and second pulse delay means each coupled to the output of said receiving means, at least one of said pulse delay means being operative to delay the echo signal respectively applied thereto as a function of its frequency content, and means coupled to both said delay means for determining the time delay between the signals respectively issuing therefrom.

2. In a radar system adapted for the transmission of a pulsed carrier signal, apparatus including means for receiving a target echo signal, first and second frequency sensitive pulse delay means each having a different time delay versus frequency characteristic, each said delay means being coupled to receive said echo signal at the output of said receiving means, and means coupled to both said delay means for determining the time delay between the signals respectively issuing from each said delay means.

3. In a radar system adapted for the transmission of recurrent pulses of frequency modulated carrier signals, apparatus including means for receiving target echo signals, first and second frequency sensitive pulse delay means each having a different time delay versus frequency characteristic, said characteristics having the same value at a predetermined frequency, each said delay means being coupled to receive said echo signals at the output of said receiving means and operative to delay each echo signal as a function of its frequency content, and means coupled to both said delay means for determining the time delay between corresponding ones of the delayed signals.

4. In a radar system apparatus including means for transmitting linearly frequency modulated pulsed carrier signals, means for receiving target echo signals, first and second frequency sensitive pulse delay means each having a different linear time delay versus frequency characteristic, said characteristics having the same value at a frequency corresponding to the center frequency of said frequency modulated carrier signals, each said delay means being coupled to receive said echo signals at the output of said receiving means and operative to delay each echo signal as a function of its frequency content, and means coupled to both said delay means for determining the time delay between corresponding ones of the delayed signals issuing from said delay means.

5. A radar system comprising means for transmitting frequency modulated pulsed carrier signals, means for receiving target echo pulses, first and second filter means each being coupled to the output of said receiving means, each said filter means introducing a different time delay in the echo pulse respectively applied thereto, and means coupled to the outputs of both said filter means for determining the time difference between corresponding ones of the pulses issuing from said filters.

6. In a radar system for the determination for target velocity, said system including means for the transmission of recurrent pulses of frequency modulated carrier signals, apparatus including means for receiving target echo pulses, first and second filter means each being coupled to the output of said receiving means, each said filter means introducing a different time delay in the echo pulse respectively applied thereto, means for measuring the time delay between pairs of pulses, means for selectively applying the corresponding delayed pulses at the outputs of said filter means to said time delay measuring means as said pulse pairs, and means for actuating said selectively applying means in the sole event that the delayed pulse at the output of said first filter means precedes the delayed pulse at the output of said second filter means.

7. In a radar system adapted for the transmission of recurrent pulses of linearly frequency modulated carrier signals, apparatus including means for receiving target echo signals, a tapped frequency sensitive pulse delay means coupled to said receiving means for over-compressing said echo signals, said delay means having a linear time delay versus frequency characteristics, the input portion of said pulse delay means terminating at the position of the tap being operative to under-compress said target signals, a frequency insensitive pulse delay means coupled to said frequency sensitive pulse delay means via said tap, and means for measuring the time delay intervening the occurrences of corresponding ones of said over-compressed signals at the output of said frequency sensitive delay means and said under-compressed signals at the output of said frequency insensitive pulse delay means.

8. In a radar system adapted for the transmission of recurrent pulses of linearly frequency modulated carrier signals, apparatus including means for receiving target echo signals, a tapped frequency sensitive pulse delay means coupled to said receiving means for over-compressing said echo signals, said delay means having a linear time delay versus frequency characteristic, the input portion of said pulse delay means terminating at the position of the tap being operative to under-compress said target signals, a frequency insensitive pulse delay means coupled to said frequency sensitive pulse delay means via said tap, means for measuring the time delay intervening the occurrences of corresponding ones of said over-compressed signals at the output of said frequency sensitive delay means and said under-compressed signals at the output of said frequency insensitive pulse delay means, and means for selectively applying said compressed signals to said means for measuring in the sole event that said under-compressed signal precedes the occurrence of the over-compressed signal.

No reference cited.